(12) United States Patent
Huter et al.

(10) Patent No.: US 12,220,778 B2
(45) Date of Patent: Feb. 11, 2025

(54) TWO-STAGE DEVICE AND METHODS FOR INSTALLING A SELF-CLINCHING FASTENER

(71) Applicant: RB&W MANUFACTURING LLC, Streetsboro, OH (US)

(72) Inventors: Alexander Huter, Bolton (CA); Gabriel Pirvulescu, Mississauga (CA)

(73) Assignee: RB&W MANUFACTURING LLC, Streetsboro, OH (US)

( * ) Notice: Subject to any disclaimer, the term of this patent is extended or adjusted under 35 U.S.C. 154(b) by 0 days.

(21) Appl. No.: 18/590,106

(22) Filed: Feb. 28, 2024

(65) Prior Publication Data

US 2024/0293900 A1     Sep. 5, 2024

Related U.S. Application Data (60) Provisional application No. 63/488,226, filed on Mar. 3, 2023.

(51) Int. Cl.
   *B23P 19/06* (2006.01)

(52) U.S. Cl.
   CPC .................................. *B23P 19/062* (2013.01)

(58) Field of Classification Search
   CPC .................................................... B23P 19/062
   See application file for complete search history.

(56) References Cited

U.S. PATENT DOCUMENTS

| | | | |
|---|---|---|---|
| 3,432,925 A | 3/1969 | Woolley | |
| 3,811,171 A | 5/1974 | Grube | |
| 3,938,239 A | 2/1976 | Lauth | |
| 4,355,531 A | 10/1982 | Rosman | |
| 4,555,838 A | 12/1985 | Muller | |
| 5,560,094 A | 10/1996 | Ladouceur et al. | |
| 6,021,562 A | 2/2000 | Boster et al. | |
| 6,220,804 B1 | 4/2001 | Pamer et al. | |
| 6,409,444 B2 | 6/2002 | Pamer et al. | |
| 7,740,436 B2 | 6/2010 | Pamer | |
| 8,062,141 B2 | 11/2011 | Pamer | |
| 9,322,424 B2 | 4/2016 | Pamer et al. | |

(Continued)

FOREIGN PATENT DOCUMENTS

EP     1839803 A1 * 10/2007 ............... B21J 15/32

OTHER PUBLICATIONS

English translation EP1839803A1 (Year: 2007).*

*Primary Examiner* — Jason L Vaughan
*Assistant Examiner* — Amanda Kreiling
(74) *Attorney, Agent, or Firm* — Chrisman Gallo Tochtrop LLC (57) ABSTRACT

A device for installing a self-attaching fastener on a substrate. The device includes a punch having an inner pin and an outer pin. The inner and outer pins are coaxial and translatable along an axis. In a first state of the punch, the inner pin is movable independently of the outer pin, and in a second state of the punch, the inner and outer pins are movable concurrently. The device further includes a die having an engagement surface configured to receive and support the substrate thereon, In a first operable stage of the punch, the punch is in the first state and configured to pierce a through-hole in the substrate. In a second operable stage of the punch, the punch is in the second state and configured to attach the self-attaching fastener to the substrate.

20 Claims, 13 Drawing Sheets

(56) References Cited

U.S. PATENT DOCUMENTS

| | | |
|---|---|---|
| 9,322,426 B2 | 4/2016 | Thomas |
| 10,697,484 B2 | 6/2020 | Pirvulescu et al. |
| 10,799,938 B2 * | 10/2020 | Skolaude ............... B21D 28/26 |
| 2005/0076492 A1 | 4/2005 | Goodsmith et al. |
| 2009/0056403 A1 | 3/2009 | Chanko |
| 2012/0142440 A1 | 6/2012 | Babej et al. |
| 2016/0298204 A1 | 10/2016 | Thomas |

* cited by examiner

TWO-STAGE DEVICE AND METHODS FOR INSTALLING A SELF-CLINCHING FASTENER

CROSS REFERENCE TO RELATED APPLICATIONS

This application claims priority to U.S. Provisional Patent Application No. 63/488,226, filed on Mar. 3, 2023, the contents of which are incorporated herein by reference.

FIELD OF THE INVENTION

The present application relates to self-attaching fasteners (e.g., clinch fasteners, such as clinch nuts and clinch bolts) and, more specifically, to devices and methods for installing (e.g., attaching, clinching, etc.) the same on a substrate.

BACKGROUND OF THE INVENTION

Self-attaching fasteners are used in many industries such as, for example, the automotive and appliance industries to secure various components to metal panels. During installation, the self-attaching fastener (e.g., a clinch bolt) must have sufficient rotational resistance to keep it from rotating relative to the metal panel when a complimentary part (e.g., a nut) is fastened thereon and tightened to the metal panel. During service, the self-attaching fastener must have sufficient pull-through resistance to keep it from pulling out of the metal panel when external forces such as, for example, vibration or other tensile forces are applied.

Some self-attaching fasteners have self-piercing capabilities, where no aperture need be formed in the substrate prior to attachment. However, other such self-attaching fasteners (or even those having self-piercing capabilities) require the substrate to have a pre-formed aperture (e.g., through-hole) prior to attachment. In such instances, this requires two separate machines, each performing a separate, independent function.

Generally, the substrate is received in a first machine (i.e., a pierce machine) where the substrate is pierced (as conventionally known). Subsequently, that pierced-substrate is transported to a separate, second machine (i.e., a clinch machine) where a self-attaching fastener is received in the pre-formed aperture and subsequently clinched to the substrate. This conventional process has multiple drawbacks. First, the above-noted method requires a manufacturer to have two separate machines (to perform the separate pierce and clinch operations), which increases cost and decreases space in the manufacturing facility. Second, the substrate must be transported from the first machine to the second machine, thereby increasing the time it takes to manufacture a finished part. Third and finally, due the aforementioned transportation, the substrate must be perfectly aligned with the fastener in the second machine. This again increases time as well as potentially yields waste (i.e., fasteners that are not clinched properly to the substrate due to misalignment errors).

BRIEF SUMMARY OF THE INVENTION

In accordance with one aspect, there is provided a device for installing a self-attaching fastener on a substrate. The device includes a punch having an inner pin and an outer pin. The inner and outer pins are coaxial and translatable along an axis. In a first state of the punch, the inner pin is movable independently of the outer pin, and in a second state of the punch, the inner and outer pins are movable concurrently. The device further includes a die having an engagement surface configured to receive and support the substrate thereon. The punch is operable in first and second stages. In the first stage, the punch is in the first state and is configured to pierce a through-hole in the substrate via the inner pin. In the second stage, the punch is in the second state and is configured to insert a portion of the self-attaching fastener through the through-hole and attach the self-attaching fastener to the substrate.

In accordance with another aspect, there is provided a method of installing a self-attaching fastener on a substrate via a device. The device includes a punch having inner and outer pins. The inner and outer pins are coaxial along an axis. The device further includes a die having an engagement surface. The method includes positioning the substrate on the engagement surface, translating the punch from a first position towards the substrate along the axis, and piercing a through-hole in the substrate via the inner pin.

Further, the method includes translating the punch towards the first position, positioning the self-attaching fastener along the axis, and translating the punch towards the substrate along the axis such that a contact surface of the punch engages the self-attaching fastener. Further still, the method includes inserting a portion of the self-attaching fastener through the through-hole via translation of the punch, and attaching the self-attaching fastener to the substrate via the punch.

In accordance with yet another aspect, there is provided a method of installing a self-attaching fastener on a substrate via a device. The device includes a punch having an inner pin and an outer pin. The inner and outer pins are coaxial and translatable along an axis. In a first state of the punch, the inner pin is movable independently of the outer pin, and in a second state of the punch, the inner and outer pins are movable concurrently. A magnet is provided at an end of said outer pin. The device further includes a loader having a movable caddy, and a die having an engagement surface configured to receive and support the substrate thereon. An aperture is formed in the die and is coaxial with said axis. Further, a guide pin is disposed within the aperture. The guide pin is translatable along the axis and has a bore formed at an end thereof.

The method includes positioning the substrate on the engagement surface, translating the punch from a first position towards the substrate along the axis, and piercing a through-hole in the substrate via the inner pin, wherein the punch is in the first state during said piercing. The method further includes translating the punch towards the first position, positioning the self-attaching fastener within the caddy, and moving the caddy such that the self-attaching fastener is aligned with the axis.

Further still, the method includes translating the punch towards the substrate along the axis such that the punch engages the self-attaching fastener via magnetic attraction between the magnet and the self-attaching fastener, and translating the guide pin from a retracted position to an extended position. In the extended position, the guide pin is received within the through-hole. The method also includes inserting the self-attaching fastener within the bore, translating the guide pin from the extended position towards the retracted position, and attaching the self-attaching fastener to the substrate via the punch, wherein the punch is in the second state during the attaching.

DESCRIPTION OF EXAMPLE EMBODIMENTS

Figure 1:
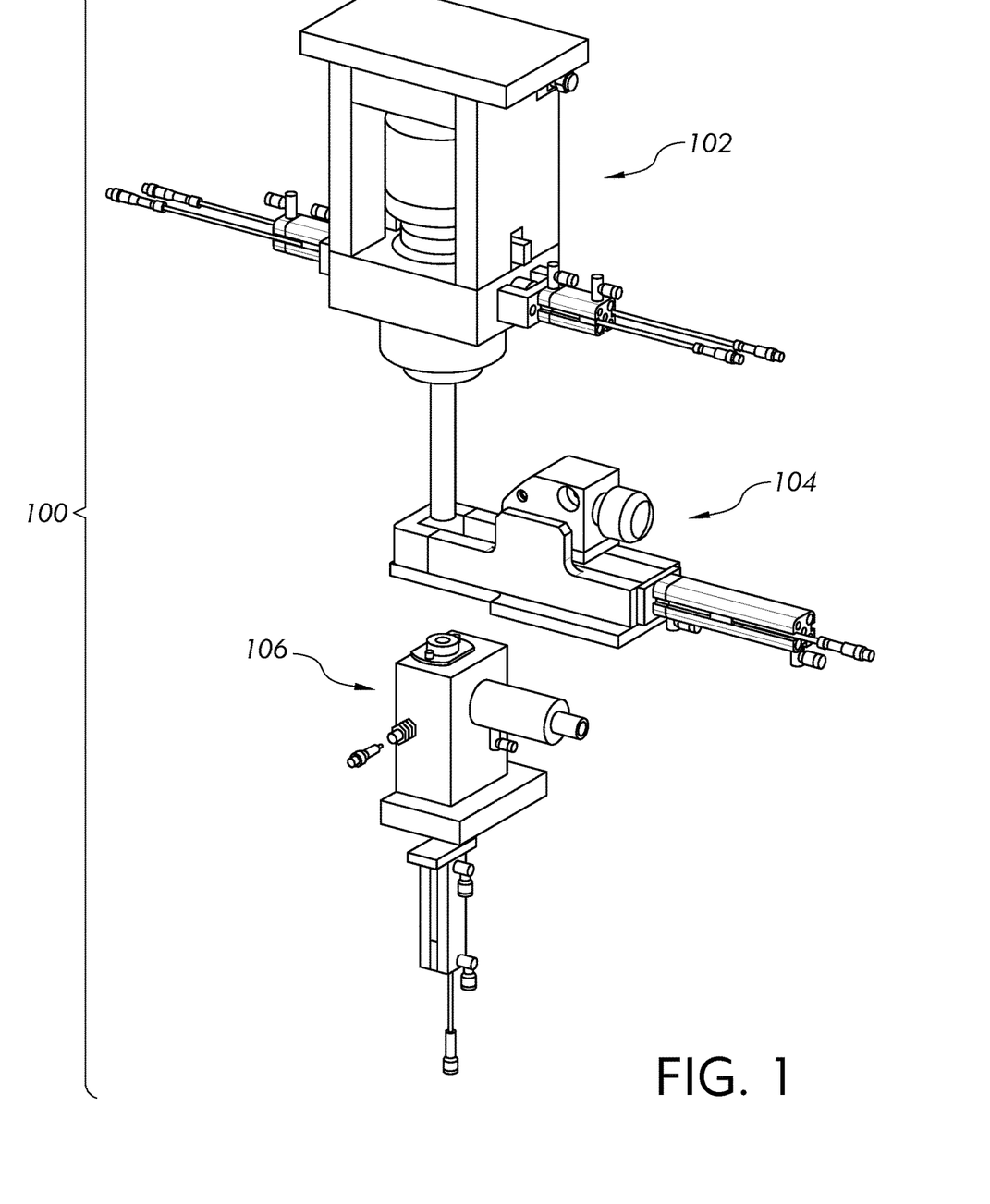
FIG. 1 is a perspective view of one embodiment of a two-stage tool for installing a self-attaching fastener.

In view of the aforementioned deficiencies in the conventional design, the present invention is directed towards a two-stage device or tool 100 (shown in FIGS. 1-2) configured to both pierce an aperture through a substrate 'S' as well as clinch a fastener 'F' (e.g., a self-attaching fastener) to said substrate 'S' in separate actions, albeit all in the same device and without repositioning the substrate 'S'. The embodiment described herein is made with reference to a substrate (e.g., a metal panel) and a fastener (e.g., a clinch bolt). It is to be understood that the substrate may be any other type of panel and that the fastener may be any other type of fastener (e.g., nut, etc.).

The tool 100 includes a punch device 102, a loader 104, and a die device 106. As shown, the punch device 102, the loader 104, and the die device 106 are vertically aligned with respect to one another (i.e., along a vertical, punch/clinch axis 'X,' shown in FIG. 2), wherein the loader 104 is disposed vertically between the punch device 102 and the die device 106. It is contemplated that the tool 100 need not have a vertical orientation, but instead can have any other alignment/orientation (e.g., horizontal, diagonal, etc.) necessary to perform the piercing/clinching operations.

Figure 2:
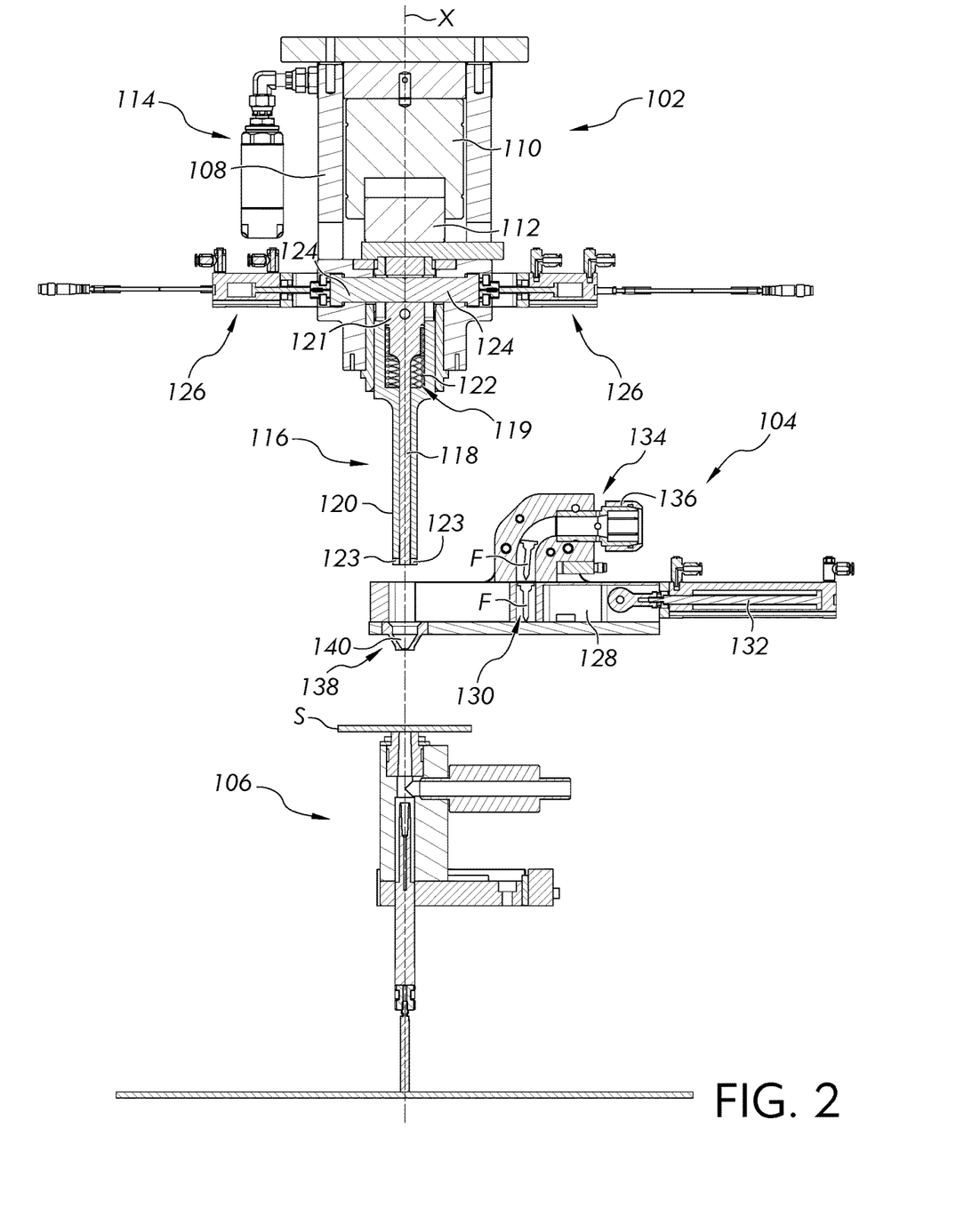
FIG. 2 is cross-sectional view of the tool shown in FIG. 1 at a beginning of a first (piercing) stage, including a punch device, a loader, and a die device.

With reference to FIG. 2, the punch device 102 includes a movable frame 108 that houses an actuator 110 therein. As will be discussed further below, the actuator 110 provides a driving force for both piercing an aperture within the substrate 'S,' and (separately) clinching the fastener 'F' to the substrate 'S'. In one embodiment (as shown), the actuator 110 is a nitrogen gas spring that drives a piston 112 (via pressurization of nitrogen gas within a cylinder) to provide said driving force (e.g., 40 kilonewtons to 200 kilonewtons). However, it is contemplated that the actuator 110 may be any other type of mechanism configured to provide a driving force (in some non-limiting examples, pneumatics, hydraulics, electric motors, etc.). Further, the punch device 102 includes a pressure monitor 114 to enhance operation of the tool 100. For example, if fluid pressure of the actuator 110 is too low or too high (i.e., outside of a predetermined operational value range), then the tool 100 may be shut down or otherwise restricted from operating. That is, the tool 100 may be shut down via electrical signals from an on-board controller (not shown), or mechanically restricted.

The punch device 102 further includes a punch 116 extending outwards from the frame 108 and which is drivable via the actuator 110. The punch 116 includes an inner (pierce) pin 118 and an outer pin 120. As shown, the inner pin 118 is nested within the outer pin 120 and is coaxial therewith (i.e., both being aligned on the axis 'X'). More specifically, the outer pin 120 is hollow such that the inner pin 118 is received within and circumferentially surrounded by the outer pin 120. As further shown, the outer pin 120 has a chamber 119 formed therein (i.e., at an end closest to the frame 108) and the inner pin 118 has a head 121 (i.e., a lip or radial protrusion formed at an end closest to the frame 108) received within the chamber 119.

Notably, in a particular state of the punch device 102 (described in further detail below), the inner pin 118 is movable independently of the outer pin 120, and is held in a home or retracted position (as shown in FIG. 2) via a spring 122. In the depicted embodiment, the spring 122 is a compression spring received within the chamber 119 of the outer pin 120 and circumferentially surrounds the inner pin 118. Moreover, a first end of the spring 122 acts on an inner wall of the chamber, and an opposite, second end of the spring 122 acts on the head 121 of the inner pin 118 such that respective contact surfaces (configured to physically engage the substrate 'S') of the inner and outer pins 118, 120 are coplanar or otherwise aligned in the retracted position, as shown. As further shown, magnet(s) 123 (i.e., a single magnet or a plurality of magnets) are provided at an end of the outer pin 120 (i.e., at or adjacent its contact surface) and are configured to magnetically hold the fastener 'F' in a desired orientation during transportation to the substrate 'S,' as will be discussed below.

Figure 7:
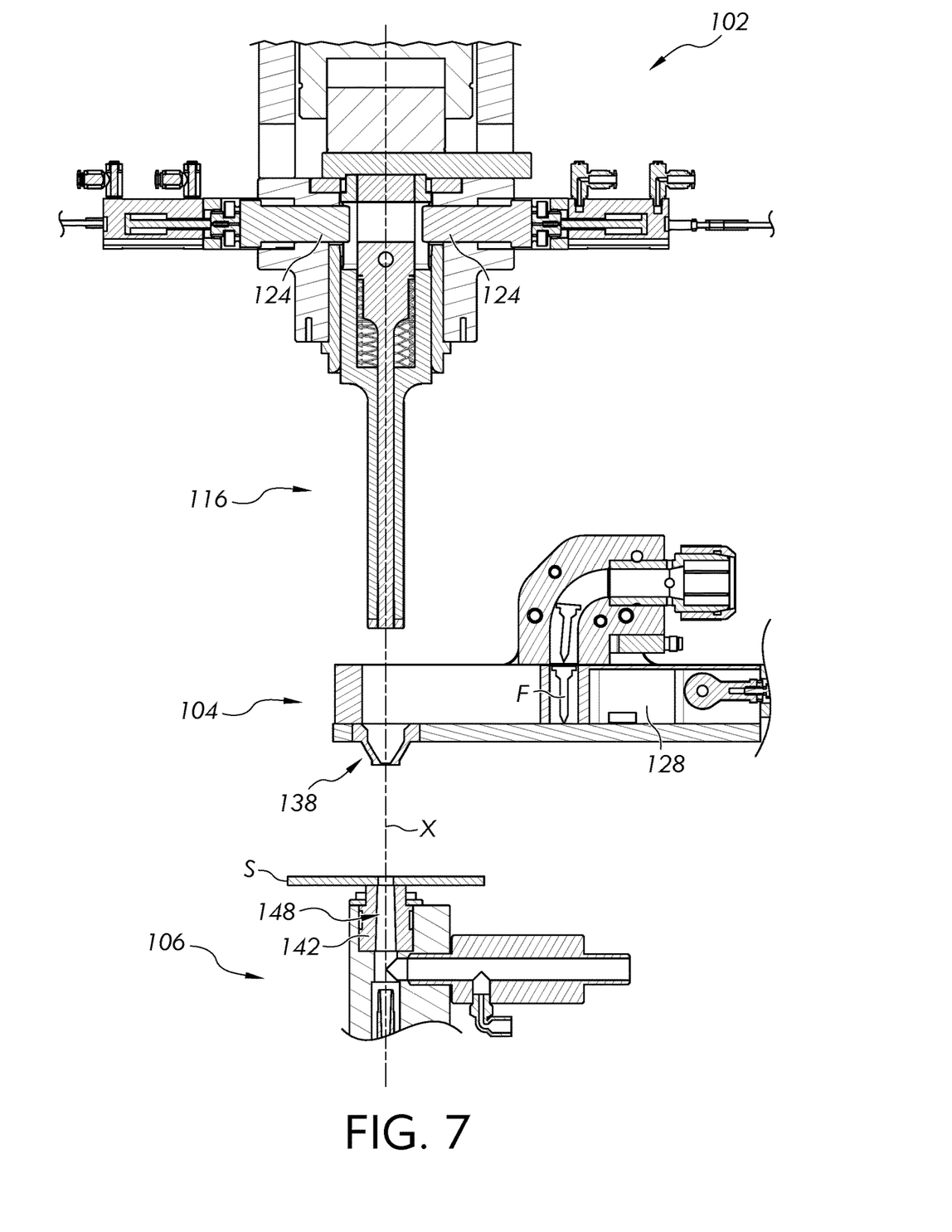
FIG. 7 is partial cross-section view of the tool shown in FIG. 1 at a beginning of a second (clinching) stage.

Of note, the ability of the inner pin 118 to move (i.e., translate) with respect to the outer pin 120 is dependent on a pair of punch locks 124 that are actuatable (i.e., repositionable) via respective pneumatic cylinders 126. In the depicted embodiment, the locks 124 are movable in a direction orthogonal to the axis 'X' to transition the punch device 102 between a first (pierce) state (as shown in FIG. 2) and a second (clinch) state (as shown in FIG. 7, discussed below). As will be further discussed below, when the punch device 102 is in the first (pierce) state, the inner pin 118 is movable (i.e., translatable along the axis 'X') independently of the outer pin 120. Alternatively, when the punch device 102 is in the second (clinch) state, the inner pin 118 is unable to move independently of the outer pin 120. That is, as will be explained below, the inner pin 118 and the outer pin 120 move in concert during the entire clinching stage or action. Of note, while the discussed embodiment depicts the locks 124 being movable via respective pneumatic cylinders 126, it is contemplated that the locks 124 may be movable in any other manner.

As further shown in FIG. 2, the loader 104 includes a movable caddy 128 that is slidable (i.e., translatable) in a direction orthogonal to the axis 'X'. The caddy 128 includes a reception slot 130 therein that is configured to receive a fastener 'F' (i.e., a self-attaching fastener) and maintain an orientation of that fastener 'F' during transportation, as discussed below. The caddy 128 is slidable via a pneumatic cylinder 132, but may be actuated in a different manner. The loader 104 further includes a hopper 134 configured to receive and store multiple fasteners 'F' therein. In particular, the hopper 134 includes a collar 136 to which a tube (carrying multiple fasteners 'F', not shown) may be removably connected for delivering fasteners 'F' to the hopper 134 from a storage bin/area. Alternatively, the hopper 134 may be hand-fed. Still in other embodiments, the hopper 134 may be fed in any other conventional manner.

The loader 104 further includes a guide 138 having first and second clamshells (only the first clamshell 140 being shown in FIG. 2) that are pivotable (e.g., via a hinged connection) so as to move between a first (closed) position and a second (open) position. Of note, the first and second clamshells are biased into the first (closed) position. Moreover, when the first and second clamshells are in the first (closed) position (as partially shown in FIG. 2) the guide 138 provides a reception area configured to receive a fastener 'F'. Alternatively, when the first and second clamshells are in the second (open) position (as partially shown in FIG. 5), the first and second clamshells are pivoted outwards and away from one another (via translation of the punch 116) so as to permit the punch 116 to translate along the axis 'X' in a direction towards the substrate 'S'. As mentioned above, and as will be discussed further below, the caddy 128 is configured to transport a single fastener 'F' from the hopper 134 to the guide 138.

Figure 3:
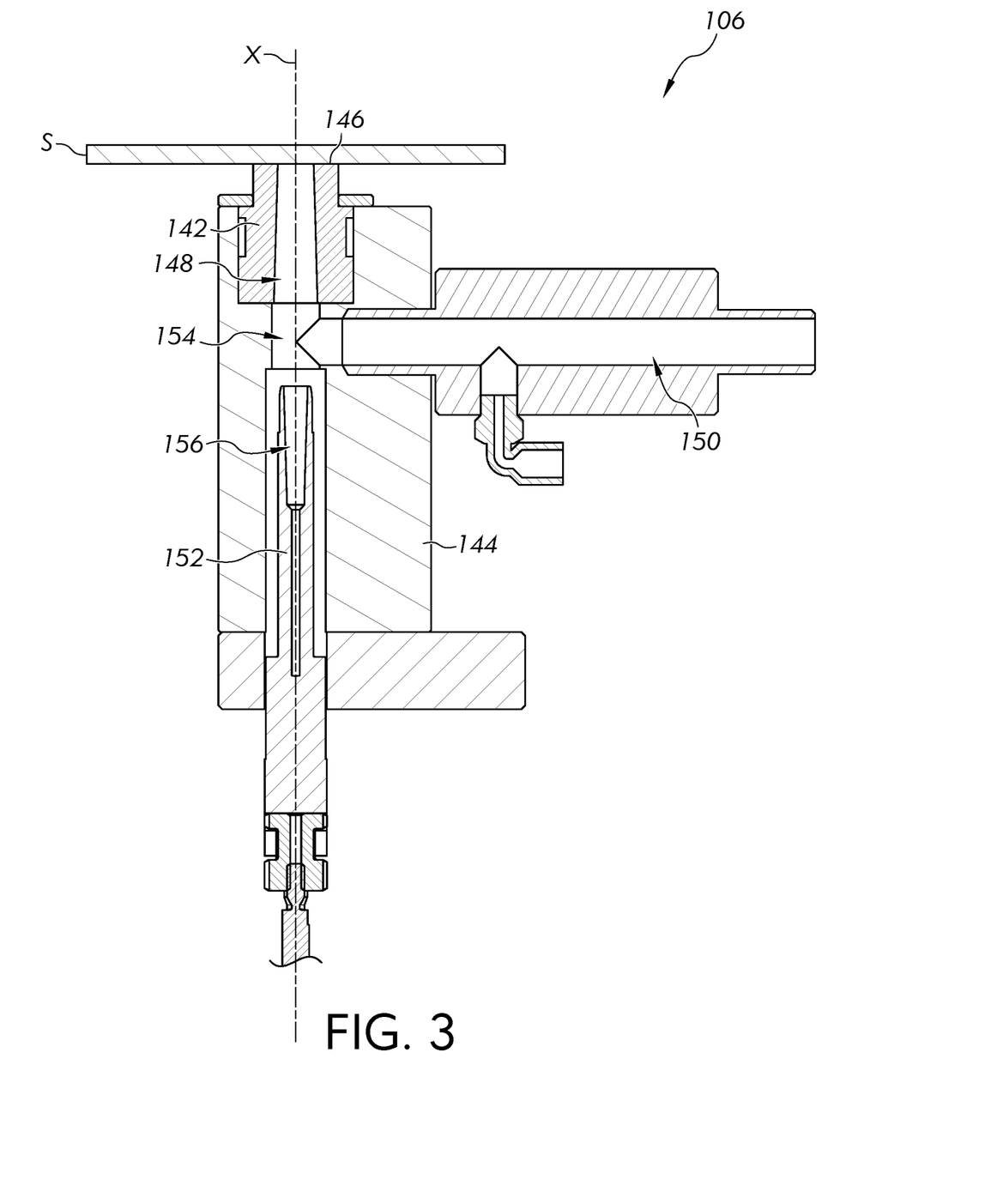
FIG. 3 is an enlarged view of the die device shown in FIG. 2.

Now with reference to FIG. 3, the die device 106 includes a die button 142 provided at a top (or outer end) of a body 144. The die button 142 has an engagement surface 146 on which the substrate 'S' rests (i.e., physically sits) during operation of the tool 100. Further, the die button 142 includes an aperture 148 (i.e., through-hole) formed therein that is coaxial with the axis 'X'. The aperture 148 is in fluid communication with a channel 150 provided in the body 144, which is in fluid communication with a vacuum source (not shown).

The die device 106 further includes a guide pin 152 received within a passage 154 of the body 144 that is coaxial with the aperture 148 of the die button 142. Notably, the guide pin 152 is movable (i.e., translatable) along the axis 'X' via a pneumatic cylinder (not shown). It is contemplated that the guide pin 152 may be movable in a manner other than by a pneumatic cylinder. Notably an outer diameter of the guide pin 152 is smaller than a diameter of the aperture 148 formed in the die button 142 such that the guide pin 152 is movably receivable within the aperture 148 during operation, as discussed further below. Moreover, the guide pin 152 has a bore 156 formed therein configured to receive a portion of the fastener 'F' (e.g., the shank of the clinch bolt) during operation, as discussed below.

Figure 4:
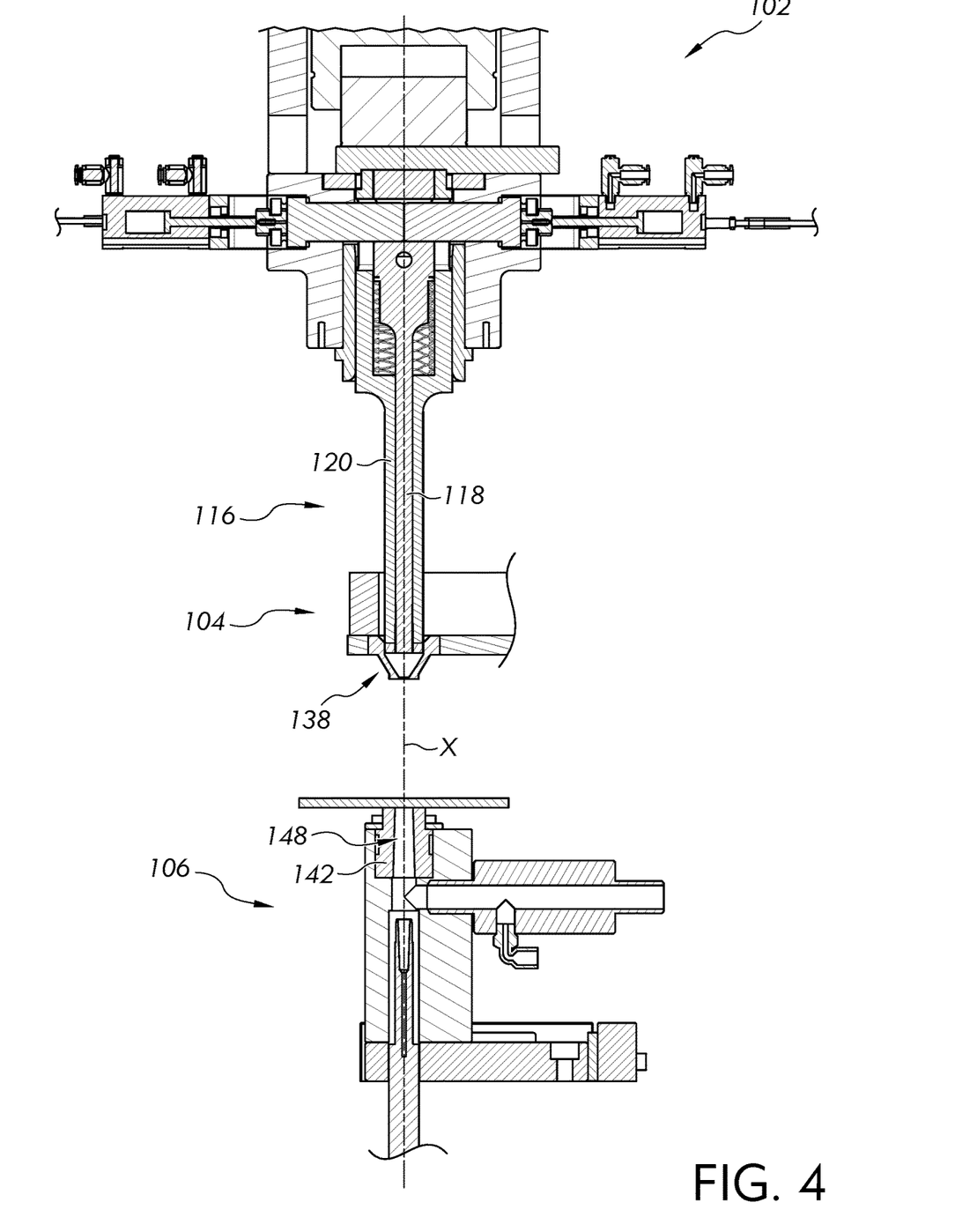
FIG. 4 is a partial, cross-section view of the tool shown in FIG. 1 during translation of the punch device during the first (piercing) stage.

Operation of the tool 100 will now be discussed with respect to its separate, two-stages. The first stage (or piercing action) begins with a substrate 'S' being received on the engagement surface 146 of the die button 142 (as shown in FIGS. 2 and 3). Further, in the first stage, the locks 124 are oriented such that the punch device 102 is in the first (pierce) state (as shown in FIG. 2). Now with reference to FIG. 4, the punch device 102 begins to translate along the axis 'X' in a direction towards the die device 106 (i.e., in the depicted embodiment, the punch device 102 translates vertically downwards). Notably, the punch device 102 is movable (i.e., translatable along the axis 'X') via a press, or other known device, not shown. As the punch device 102 translates, the guide 138 of the loader 104 receives an engaging end of the punch 116 (i.e., the respective contact surfaces of the inner and outer pins 118, 120). With respect to FIG. 5, further continual movement of the punch device 102 (i.e., towards the die device 106) results in forcibly moving (i.e., pivoting) the first and second clamshells of the guide 138 against their bias to the second (open) position, thereby permitting the punch device 102 (i.e., the punch 116) to continue translating towards the substrate 'S'.

Figure 5:
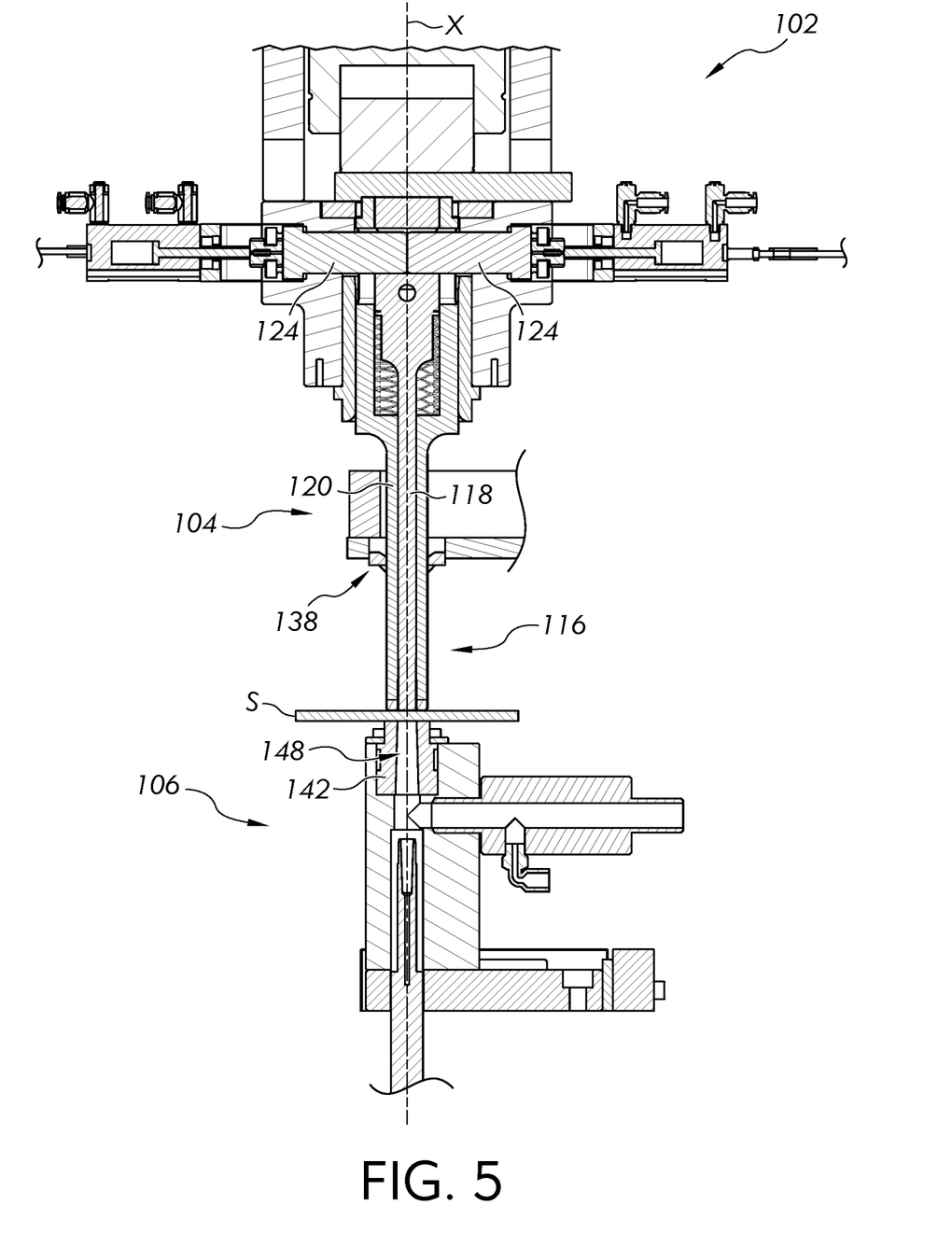
FIG. 5 is another partial cross-section view of the tool shown in FIG. 1 during translation of the punch device during the first (piercing) stage.
Figure 6:
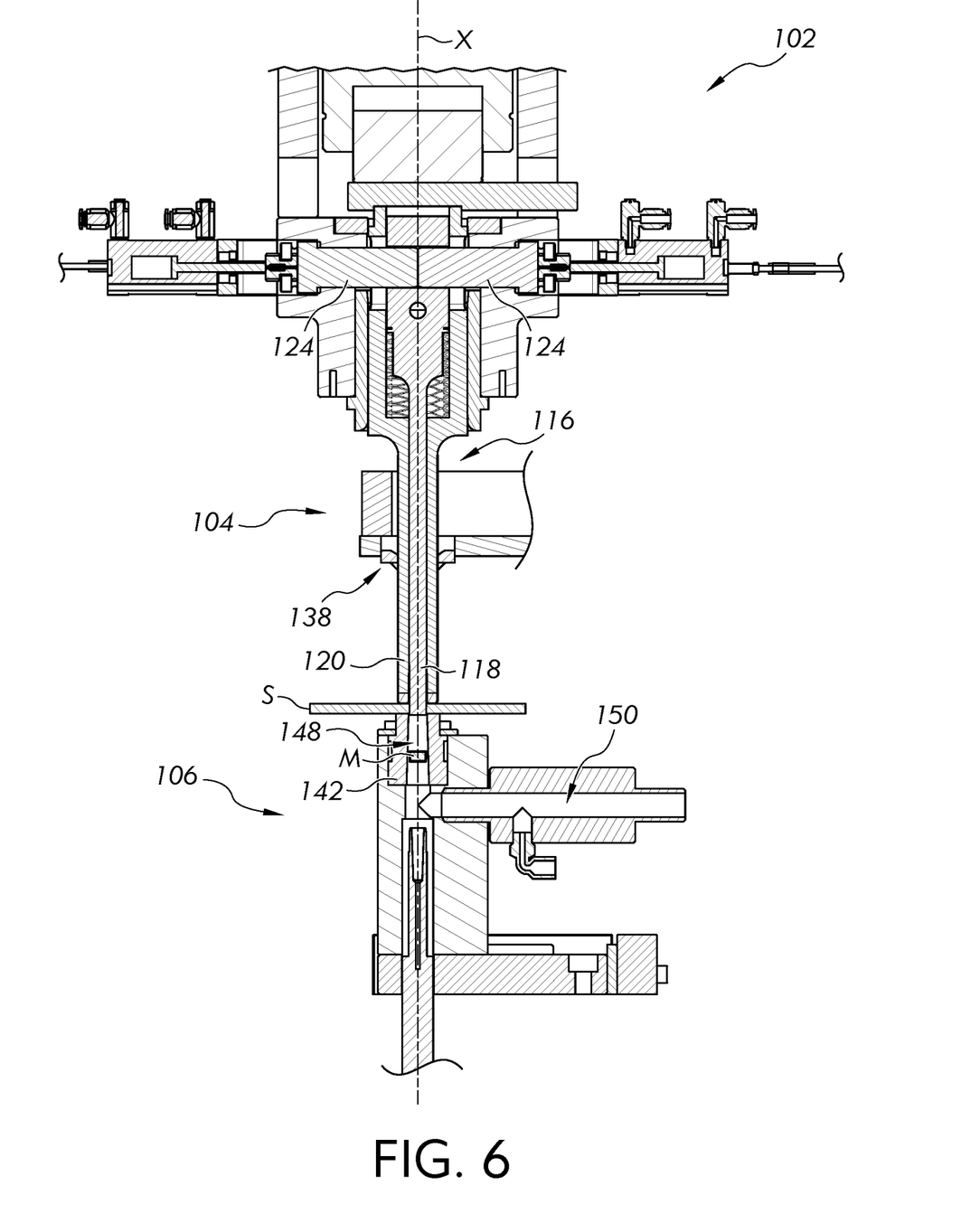
FIG. 6 is another partial cross-section view of the tool shown in FIG. 1 during a piercing operation of the first (piercing) stage.

As shown in FIG. 5, the punch device 102 continues to translate until the engaging end of the punch 116 (i.e., the respective contact surfaces of the inner and outer pins 118, 120) reaches (i.e. disposed adjacent and/or making physical contact with) the substrate 'S'. With reference to FIG. 6, with the locks 124 being oriented such that the punch device 102 is in the first (pierce) state, and as the actuator 110 provides the drive force (via the piston 112), the inner pin 118 continues to translate (along the axis 'X') towards the die device 106, whereas the outer pin 120 of the punch 116 remains stationary. That is, with the punch device 102 in the first (pierce) state, after the outer pin 120 engages (e.g., physically contacts) the substrate 'S', the outer pin 120 is restricted from further movement (i.e., towards the die device 106), whereas the inner pin 118 is able to continue translating (independently) of the outer pin 120 (via the driving force of the actuator 110) to thereby pierce an aperture in the substrate 'S'. Notably, the removed material 'M' (i.e., the pierced piece) of the substrate 'S' falls into the aperture 148 of the die button 142 and is guided into the channel 150 of the body 144 via the vacuum source (not shown).

After piercing the substrate 'S,' the first stage concludes with the punch device 102 returning to its original (i.e., home) position, as shown in FIG. 7. Notably, while the punch 116 translates along the axis 'X,' (i.e., towards its home position) the force exerted on the first and second clamshells of the guide 138 will cease (i.e., as the punch 116 no longer engages with the guide 138), thus resulting in the guide 138 reverting back to the first (closed) position in accordance with its bias. After the punch device 102 reaches its home position, the second stage (or clinching action) begins with the locks 124 being reoriented such that the punch device 102 is operably placed in the second (clinch) state, as depicted in FIG. 7. As briefly mentioned above, when the punch device 102 is in the second (clinch) state (via the corresponding orientation of the locks 124), the inner and outer pins 118, 120 move in tandem. That is, unlike the first stage detailed above (i.e., wherein the drive force is applied only to the inner pin 118), the drive force (via the actuator 110) will be applied to both the inner and outer pins 118, 120 during the second stage.

Figure 8:
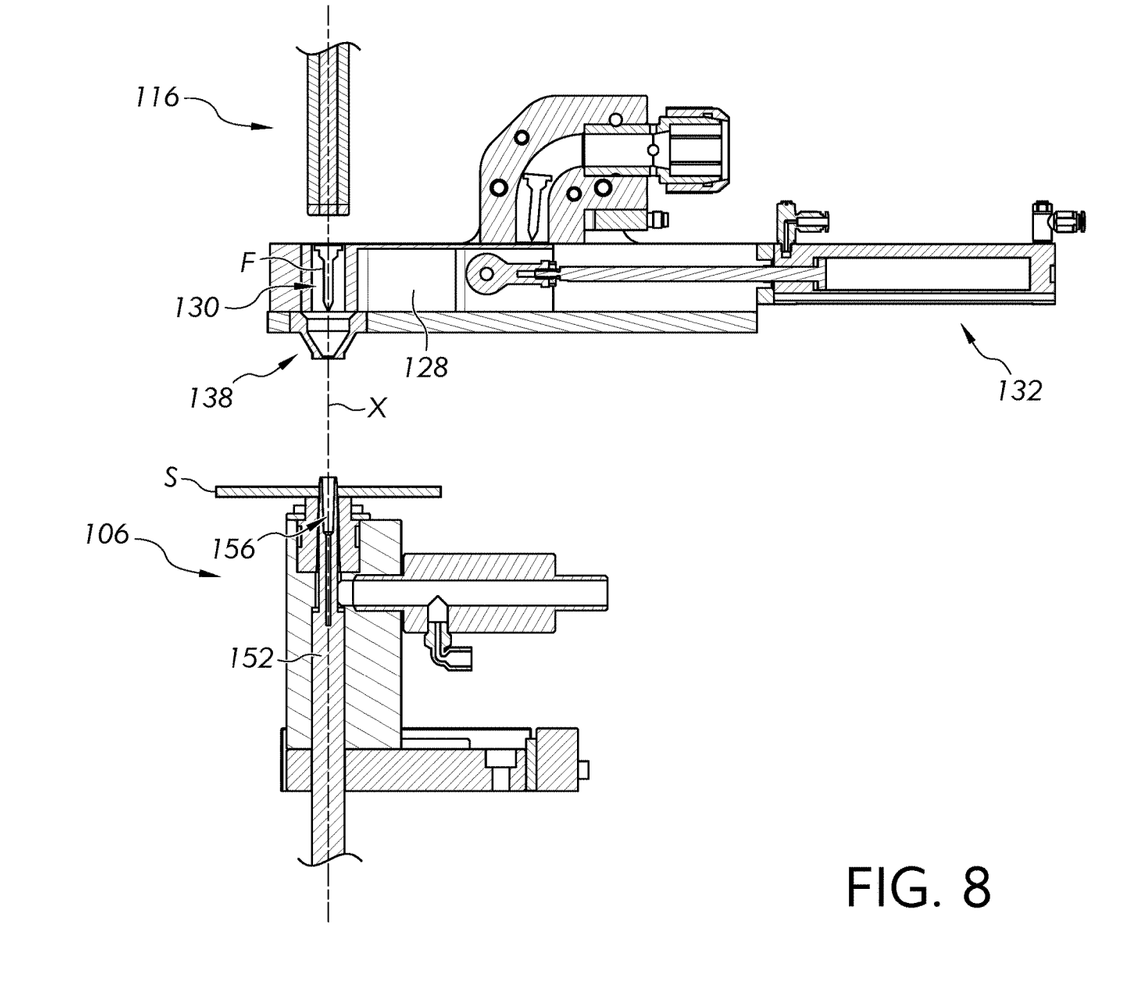
FIG. 8 is an enlarged, partial cross-section view of the loader and the die device shown in FIG. 1 during the second (clinching) stage.
Figure 9:
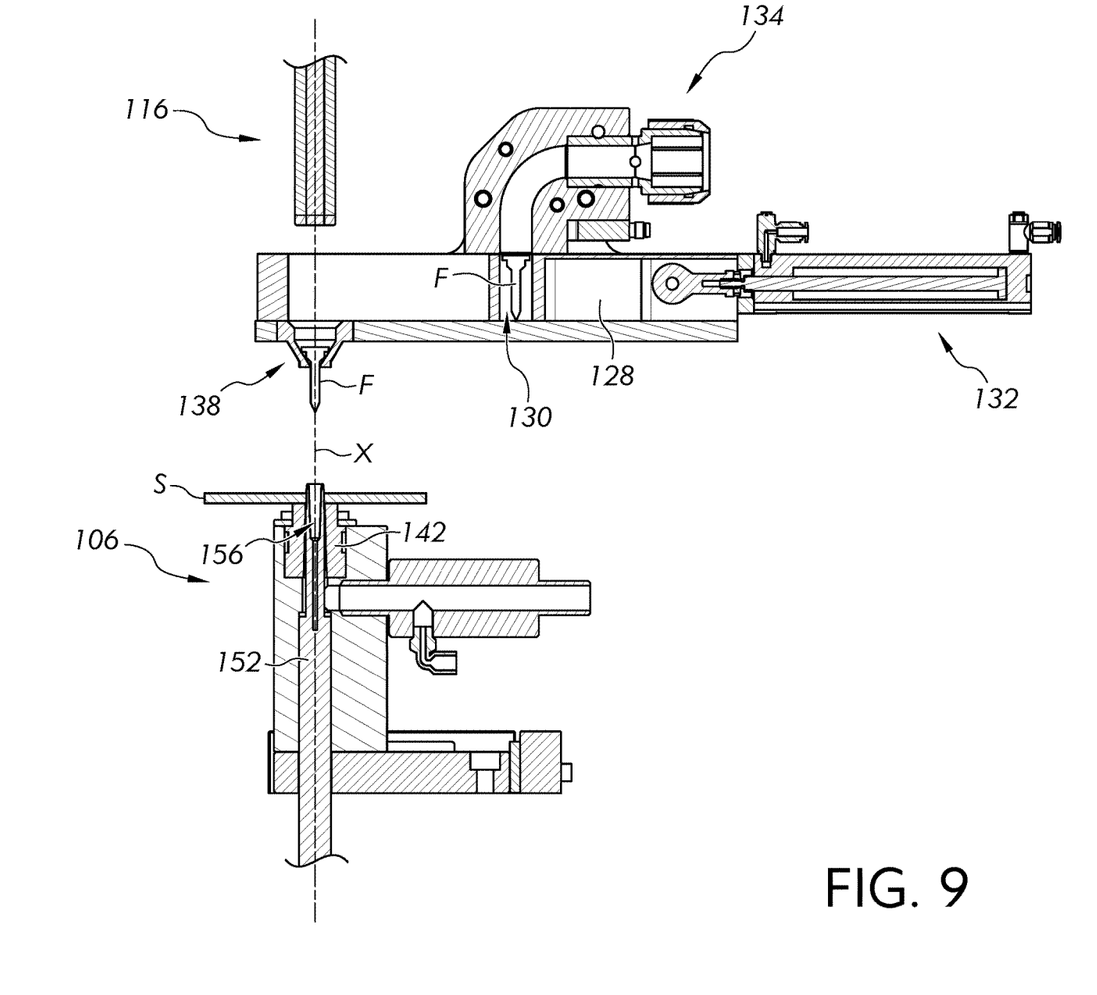
FIG. 9 is another enlarged, partial cross-section view of the loader and the die device shown in FIG. 1 during the second (clinching) stage.

Next, as shown in FIG. 8, the caddy 128 (loaded with a single fastener 'F') translatably slides (via the pneumatic cylinder 132) until its reception slot 130 is aligned with (i.e., coaxial to) the guide 138. Thereafter, the transported fastener 'F' falls (e.g., via gravity) into the guide 138 and is held in a correctly oriented position (i.e., coaxial with the axis 'X') via correspondingly-shaped, respective internal surfaces of the first and second clamshells, as depicted in FIG. 9. Notably, while the caddy 128 transports the fastener 'F' to the guide 138, the guide pin 152 simultaneously moves (i.e., translates) along the axis 'X' such that it is received within the aperture 148 of the die button 142 (as shown in FIGS. 8-9). Moreover, as shown, an end of the guide pin 152 extends outwards of the aperture 148 of the die button 142 and passes through the previously formed aperture in the substrate 'S'. This is an important step, as the guide pin 152 acts as an indicator as to whether an aperture has been properly formed in the substrate 'S' in the preceding stage. If no aperture is located (via the guide pin 152) then an on-board controller may stop the remaining operations of the second stage, thus preventing part waste and/or machine downtime. As further shown in FIG. 9, after one fastener 'F' has been received in the guide 138, the caddy 128 returns to its original position and is reloaded (via the hopper 134) with yet another fastener 'F.'

Figure 10:
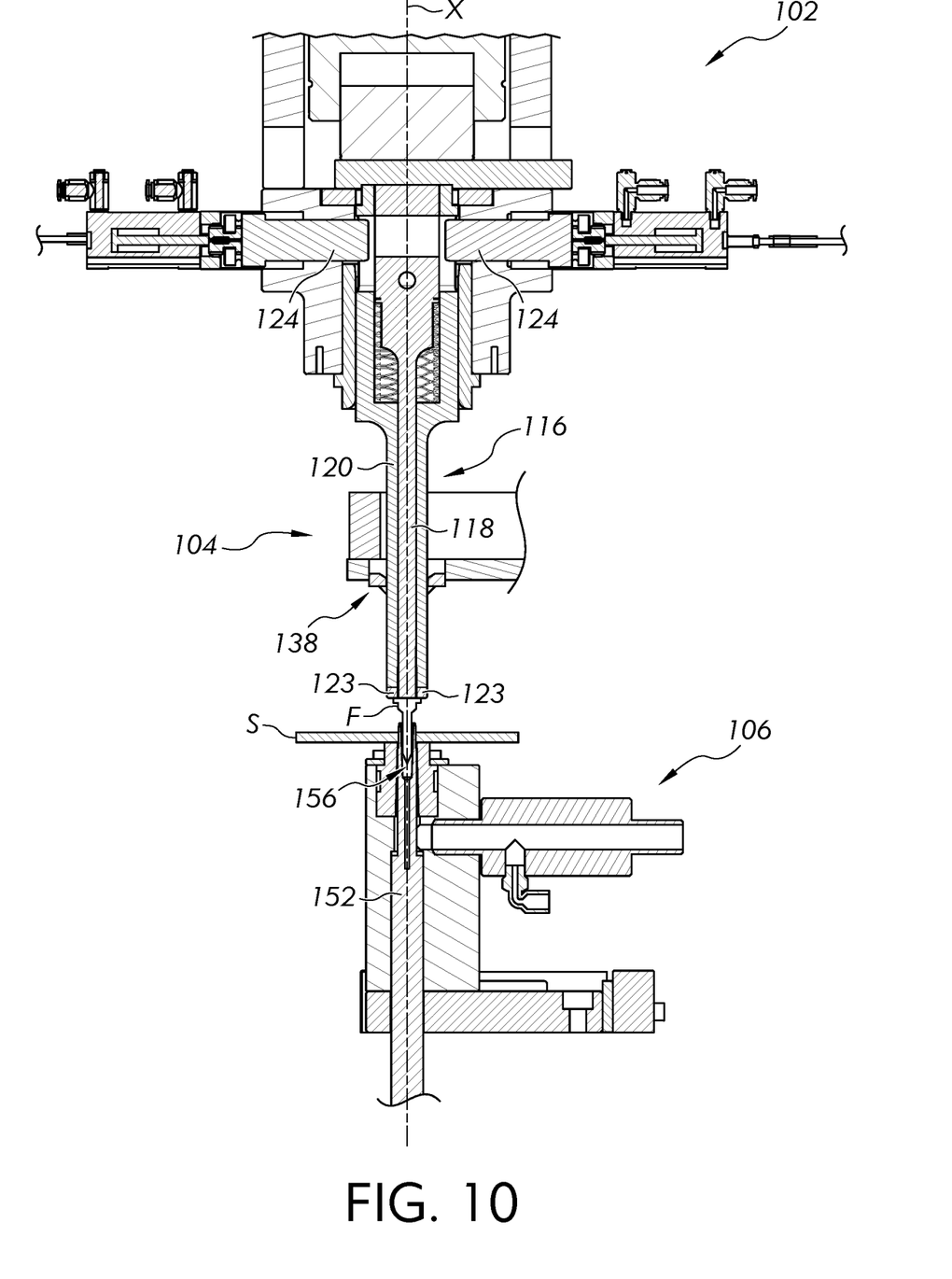
FIG. 10 is another partial cross-section view of the tool shown in FIG. 1 during translation of the punch device during the second (clinching) stage.
Figure 11:
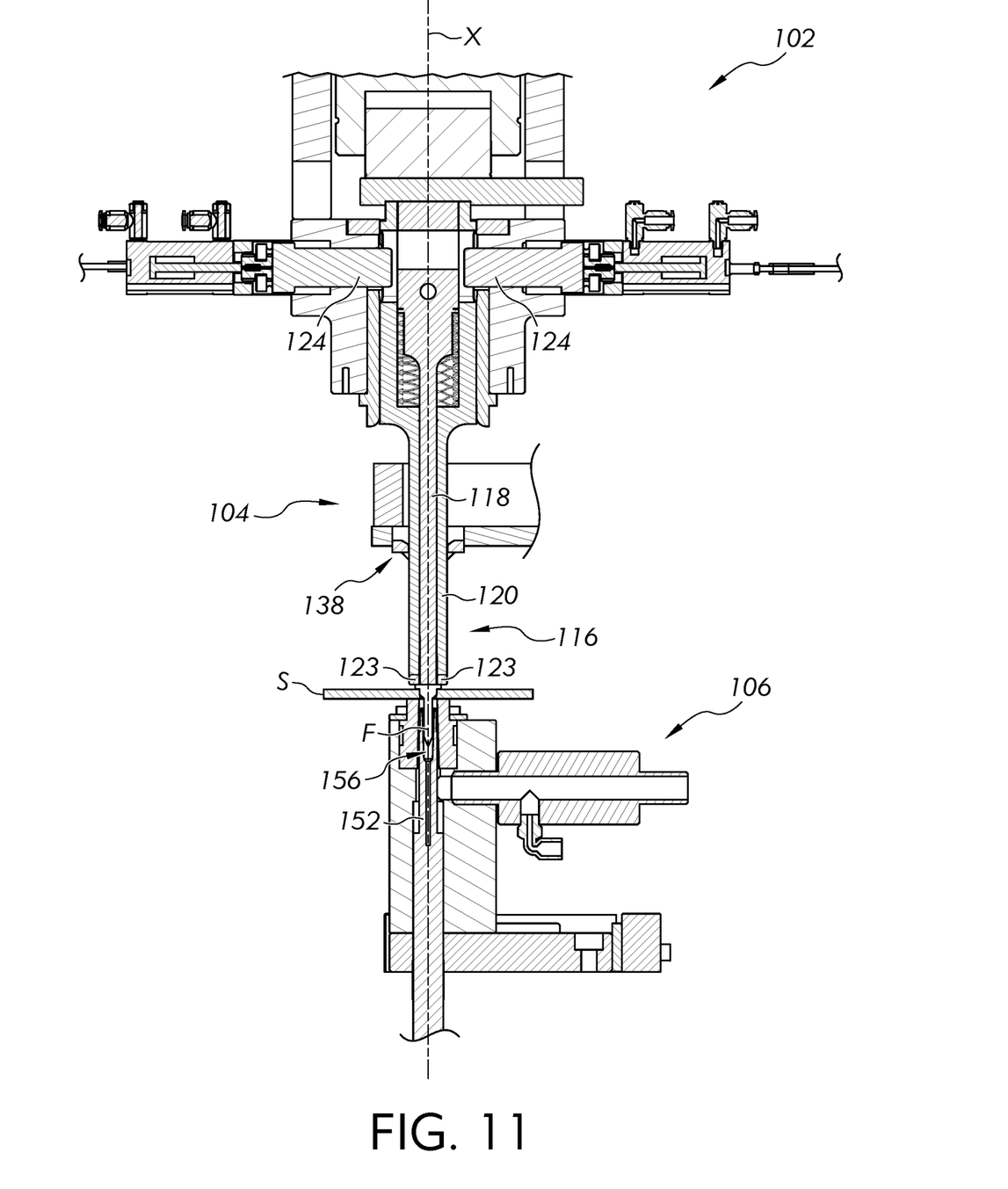
FIG. 11 is another partial cross-section view of the tool shown in FIG. 1 during a clinching operation of the second (clinching) stage.

After the fastener 'F' has been received in the guide 138, the second stage continues with the punch device 102 translating (i.e., vertically downwards) towards the die device 106. When the engaging end of the punch 116 (i.e., the respective contact surfaces of the inner and outer pins 118, 120) reaches the fastener 'F' (which is held captive in the guide 138), the fastener 'F' is magnetically attracted thereto (i.e., via the magnet(s) 123) and thus will remain in the correctly oriented position (i.e., aligned along the axis 'X'). Subsequently, the first and second clamshells of the guide 138 are forcibly moved (i.e., pivoted) in the same manner as noted above, and the punch device 102 continues to translate towards the die device 106. With reference to FIG. 10, as the punch device 102 continues to translate, a portion of the fastener 'F' (e.g., the shank) will be inserted into the bore 156 of the guide pin 152, and the punch device 102 (along with the guide pin 152) will continue to translate (i.e., vertically downwards) until the fastener 'F' reaches (e.g., disposed directly adjacent, makes physical contact with, etc.) the substrate 'S' (as shown in FIG. 11). Notably due to the coaxial alignment of the above-noted devices during both the first (piercing) and second (clinching) stages, the fastener 'F' is translated (via the punch device 102) perfectly into the aperture formed previously in the substrate 'S'.

Figure 12:
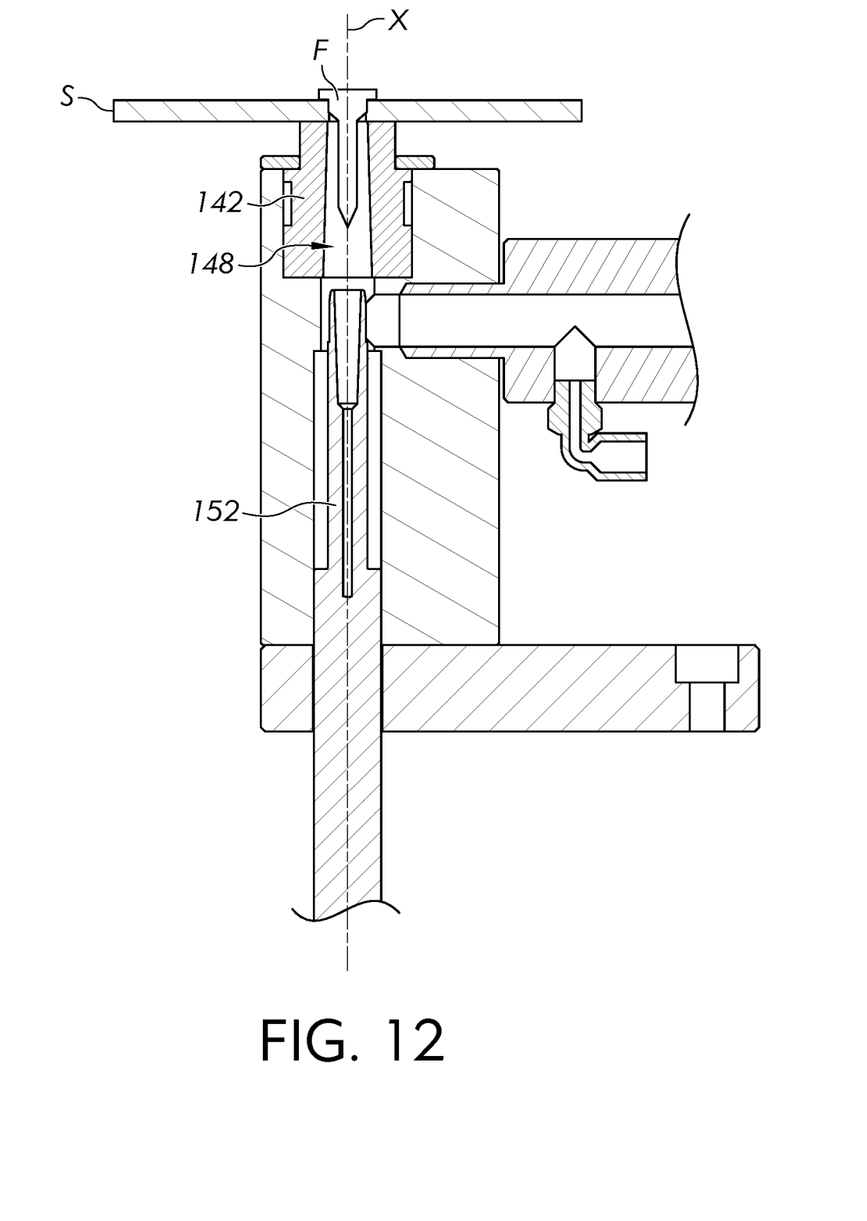
FIG. 12 is an enlarged, partial cross-section view of the die device shown in FIG. 1 after the clinching operation of the second (clinching) stage.
Figure 13:
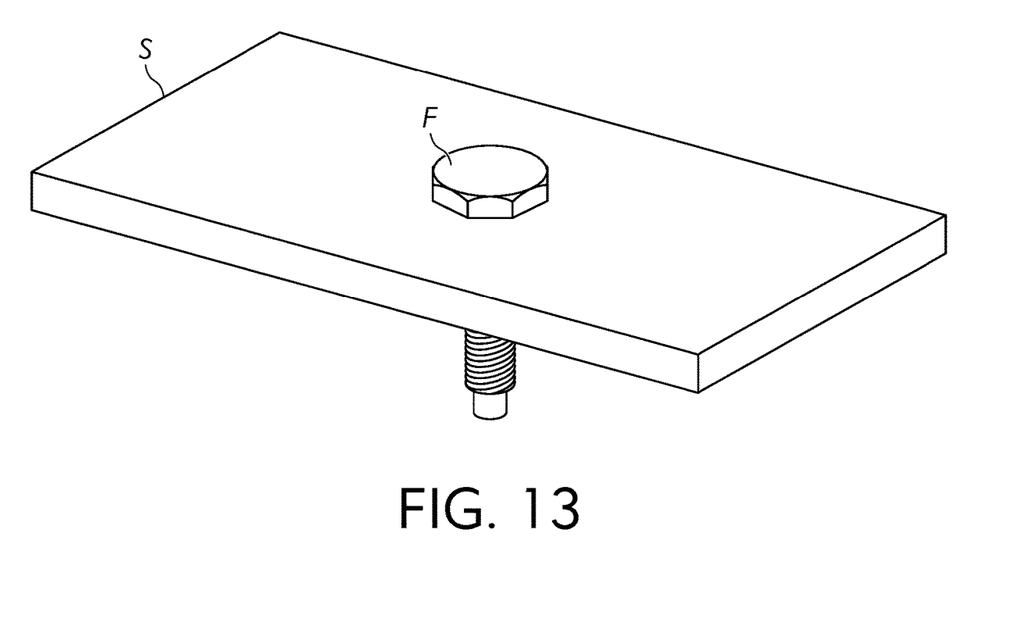
FIG. 13 is perspective view of a completed (i.e., clinched) part.

Thereafter, as shown in FIG. 11, the actuator 110 provides the drive force to the punch 116 (i.e., both the inner and outer pins 118, 120), resulting in the fastener 'F' being clinched to the substrate 'S' (e.g., a completed clinching part being shown in FIG. 13). After clinching the fastener 'F' to the substrate 'S,' the punch device 102 returns to its home position for preparation in restarting the two-stage action of piercing and clinching. Notably, as shown in FIG. 12, as the punch device 102 returns to its home position, the guide pin 152 translates (vertically downwards) such that the fastener 'F' (e.g., its shank) is no longer received within the bore 156 of the guide pin 152.

Due to the respective dimensions of the guide pin 152 and the aperture 148 of the die button 142, when the guide pin 152 retreats back to its original position, a spaced distance is provided between a circumferential wall that defines the aperture 148 and the fastener 'F' (i.e., the shank). This spaced distance improves efficiency when removing the completed part from the tool 100 (as shown in FIG. 12). Indeed, removal of the completed part (i.e., as shown in FIG. 13) is generally performed by a robot, thereby already exhibiting high efficiency and enhanced throughput. However, because the above-noted spaced distance exists, the robot does not need to be calibrated or programmed to be so precise as to extract the completed part coaxially along the axis 'X.'

In sum, the above-described two-stage tool 100 and associated method reduces machine costs, saves floor space within a facility, and enhances both efficiency and accuracy (thereby reducing production costs). This is achieved by performing two separate operations (i.e., a pierce action and a clinch action) coaxially in a single machine. In other words, the manufacturer only needs one machine to perform two separate operations. Moreover, as the two-stage tool 100 performs both operations in-line (i.e., coaxially), there is no need to reposition the substrate (e.g., after piercing) in between those operations. Rather, the substrate remains in a single position during both operations, thereby reducing potential misalignment issues.

The invention has been described with reference to example embodiments. Modifications and alterations thereto will be evident to persons of skill in the art upon a reading and understanding this specification.

What is claimed is:

1. A device for installing a self-attaching fastener on a substrate, the device comprising:
   a punch including an inner pin and an outer pin, said inner and outer pins being coaxial and translatable along an axis, wherein in a first state of the punch, the inner pin is movable independently of the outer pin, and wherein in a second state of the punch, the inner and outer pins are movable concurrently; and
   a die having an engagement surface configured to receive and support the substrate thereon,
   wherein said punch is operable in first and second stages, wherein in said first stage, said punch is in said first state and configured to pierce a through-hole in said substrate via said inner pin, and wherein in said second stage, said punch is in said second state and configured to insert a portion of said self-attaching fastener through said through-hole and attach said self-attaching fastener to said substrate.

2. The device of claim 1, said outer pin being hollow and having a chamber formed therein, wherein said inner pin is received within said outer pin and includes a head disposed within said chamber.

3. The device of claim 2, further comprising a spring disposed within said chamber, said inner and outer pins having respective contact surfaces configured to engage said self-attaching fastener during said second stage of said punch, said spring configured to bias the inner pin in a position wherein said respective contact surfaces of the inner and outer pins are coplanar.

4. The device of claim 3, wherein said spring has first and second ends, wherein said first end engages an inner wall of the chamber, and wherein said second end engages the head.

5. The device of claim 1, further comprising a lock, said lock being movable in opposite, first and second directions to place said punch in said first and second states, respectively.

6. The device of claim 1, further comprising a guide pin disposed within an aperture of said die, wherein said guide pin is translatable along said axis, and includes a bore formed at an end thereof and configured to receive a portion of said self-attaching fastener.

7. The device of claim 6, wherein said guide pin is configured to translate between first and second positions, wherein in said first position, said end does not extend outside of said aperture, and wherein in said second position, said end extends out of the aperture such that said guide pin extends through said through-hole.

8. The device of claim 1, further comprising a loader having a caddy configured to receive the self-attaching fastener, said caddy being movable between first and second positions, wherein in the first position, the caddy is aligned with the axis, and in the second position, the caddy is not aligned with the axis.

9. The device of claim 1, wherein a magnet is provided at an end of the outer pin, said magnet configured to magnetically secure the self-attaching fastener to the punch.

10. The device of claim 1, further comprising an actuator, wherein when the punch is in the first state, the actuator is configured to provide a driving force to said inner pin, and wherein when the punch is in the second state, the actuator is configured to provide said driving force to said inner pin and said outer pin.

11. A method of installing a self-attaching fastener on a substrate via a device, said device comprising a punch having inner and outer pins, said inner and outer pins being coaxial along an axis, and a die having an engagement surface, said method comprising:
- positioning the substrate on the engagement surface;
- translating the punch from a first position towards said substrate along the axis;
- piercing a through-hole in the substrate via said inner pin;
- translating said punch towards said first position;
- positioning the self-attaching fastener along said axis;
- translating said punch towards said substrate along said axis such that a contact surface of the punch engages said self-attaching fastener;
- inserting a portion of said self-attaching fastener through said through-hole via translation of said punch; and
- attaching said self-attaching fastener to said substrate via said punch.

12. The method of claim 11, wherein an aperture is formed in said die and is coaxial with said axis, wherein a guide pin is disposed within said aperture and is translatable along said axis, and wherein after said through-hole is pierced in said substrate, the method further comprises a step of translating said guide pin from a retracted position to an extended position, wherein in said retracted position, said guide pin does not extend through said through-hole, and wherein in said extended position, a portion of said guide pin extends outside of said aperture and through said through-hole.

13. The method of claim 12, wherein said guide pin has a bore formed therein, and wherein after said guide pin is translated to said extended position, the method further comprises a step of inserting the self-attaching fastener within said bore.

14. The method of claim 13, wherein after said self-attaching fastener is inserted within said bore, the method further comprises a step of translating the guide pin from said extended position towards said retracted position, such that said self-attaching fastener is no longer received within said bore of said guide pin.

15. The method of claim 11, wherein said outer pin has a magnet at an end thereof, wherein said contact surface of the punch engages said self-attaching fastener via magnetic attraction between said magnet and said self-attaching fastener.

16. The method of claim 11, wherein said punch is operable in first and second states, wherein in said first state, the inner pin is movable independently of the outer pin, and wherein in said second state, the inner and outer pins are movable concurrently, wherein during said step of piercing, said punch is in said first state, and wherein during said step of attaching, said punch is in said second state.

17. The method of claim 16, wherein after said step of piercing, the method further comprises moving a lock so as to transition the punch from said first state to said second state.

18. The method of claim 12, wherein after said step of piercing, the method further comprises guiding a removed piece of the substrate out of said aperture and into a channel of the die via suction.

19. The method of claim 11, wherein during said step of piercing, an actuator provides a driving force to said inner pin to pierce said substrate, and wherein during said step of attaching, said actuator provides said driving force to both said inner and outer pins to attach said self-attaching fastener to said substrate.

20. A method of installing a self-attaching fastener on a substrate via a device, said device comprising:
- a punch including an inner pin and an outer pin, said inner and outer pins being coaxial and translatable along an axis, wherein in a first state of the punch, the inner pin is movable independently of the outer pin, and wherein in a second state of the punch, the inner and outer pins are movable concurrently;
- a magnet provided at an end of said outer pin;
- a loader having a movable caddy;
- a die having an engagement surface configured to receive and support the substrate thereon, wherein an aperture is formed in the die and is coaxial with said axis; and
- a guide pin disposed within said aperture, said guide pin being translatable along said axis and having a bore formed at an end thereof, wherein the method comprises:
- positioning the substrate on the engagement surface;
- translating the punch from a first position towards said substrate along the axis;
- piercing a through-hole in the substrate via said inner pin, wherein said punch is in said first state during said piercing;
- translating said punch towards said first position;
- positioning the self-attaching fastener within the caddy;
- moving the caddy such that the self-attaching fastener is aligned with the axis;
- translating said punch towards said substrate along said axis such that the punch engages said self-attaching fastener via magnetic attraction between said magnet and said self-attaching fastener;
- translating said guide pin from a retracted position to an extended position, wherein in said extended position, the guide pin is received within the through-hole;
- inserting the self-attaching fastener within said bore;
- translating said guide pin from said extended position towards said retracted position; and
- attaching said self-attaching fastener to said substrate via said punch, wherein said punch is in said second state during said attaching.

\* \* \* \* \*